Aug. 30, 1932. S. M. HALSTEAD ET AL 1,874,006
BRAKE TESTING MACHINE
Filed Oct. 19, 1929 2 Sheets-Sheet 2
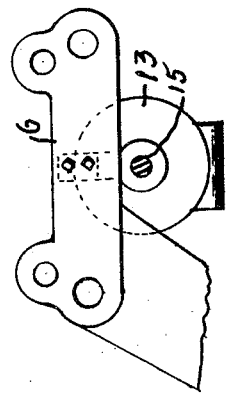
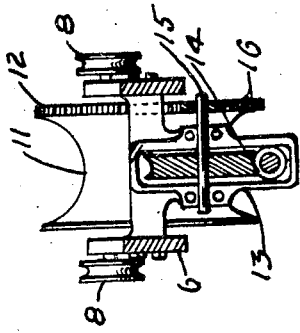
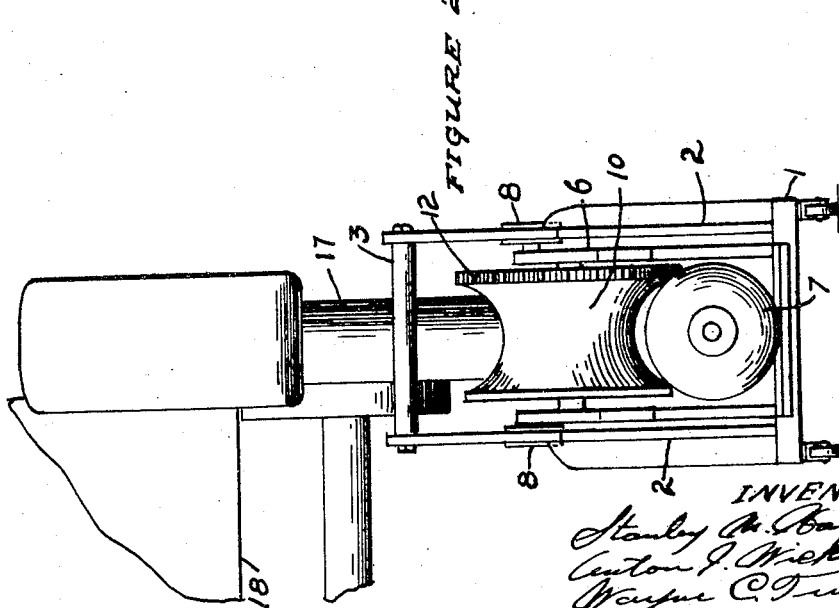

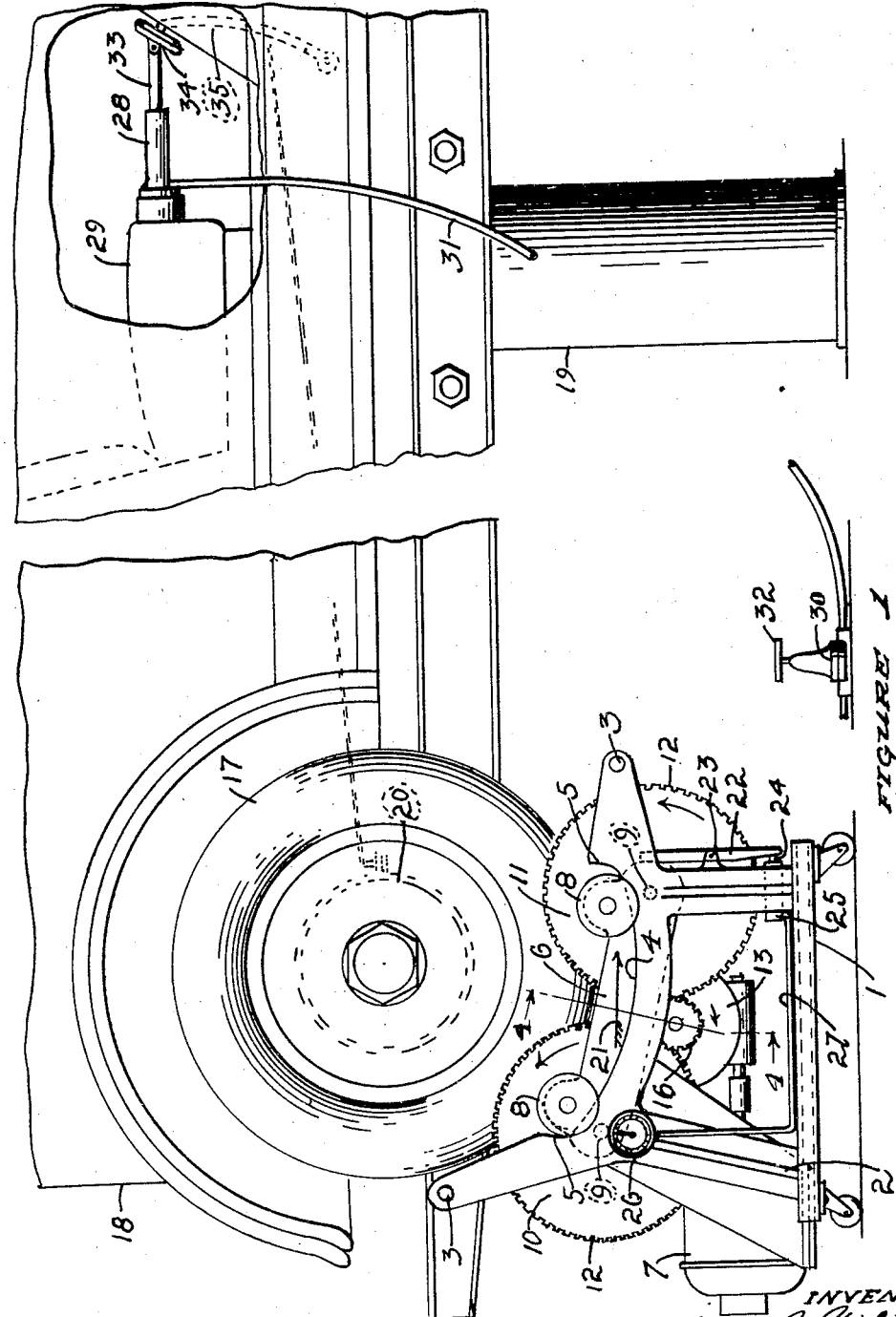

Patented Aug. 30, 1932

1,874,006

UNITED STATES PATENT OFFICE

STANLEY M. HALSTEAD, ANTON I. WICKLAND AND WAYNE C. TUSTIN, OF SAN JOSE, CALIFORNIA

BRAKE TESTING MACHINE

Application filed October 19, 1929. Serial No. 400,908.

It is the object of the invention to provide a machine for testing automobile brakes, and recording the result of said test.

It is also an object of the invention to provide a machine of the character indicated associated with means for applying a given recorded pressure to the brake lever whereby the several wheels of the automobile may be uniformly and accurately adjusted.

It is another object of the invention to provide a machine of the character indicated that will accurately measure the brake resistance of an automobile wheel under conditions simulating actual conditions on the road.

It is still another object of the invention to provide a machine of the character indicated that will be small and compact, quickly and easily applied to a wheel or removed therefrom, positive and accurate in operation, strong, durable and highly efficient in its practical application.

Finally, it is an object to provide a machine of the character indicated whereby a predetermined pressure in pounds may be applied to the brake lever and a record in pounds obtained of the resistance to rotation of the wheel, so that adjustments may be made to the vehicle tested to properly proportion the one to the other.

Figure 1 is a side elevation of a device embodying our invention in operative relation to an automobile, portions of the latter being broken away.

Figure 2 is an end elevation of the same.

Figure 3 is a side elevation of a portion of the cradle and parts associated therewith.—

Figure 4 is a section on line 4—4 of Figure 1.

In the embodiment of the invention as here-in disclosed, we show at 1 a wheeled platform carrying a pair of side brackets 2 connected and braced by bars 3, these supporting brackets having their upper edges formed into arcuate tracks as shown at 4 terminating in stops as at 5.

A cradle is shown at 6, carrying an electric motor as 7 and fitted with pairs of wheels 8 adapted to ride upon the tracks 4. Revolubly mounted in the cradle 6 as at 9 are a pair of aligned rollers as 10 and 11 having their corresponding side edges provided with teeth as 12. A gear case 13 is mounted on the cradle 6 between rollers 10 and 11, and in the case is mounted a worm gear 14, the worm being driven by motor 7 and the gear driving a shaft 15 which carries a pinion 16 meshing with the teeth 12 in the rollers 10—11.

By means of the construction above set forth the wheel as 17 of an automobile 18 may be raised into position to seat on rollers 10—11 in any suitable manner as by elevator 19. Upon setting the motor 7 in operation the rollers 10—11 may be rotated as indicated by the arrows with the result that the wheel 17 is set in motion. If the wheel 17 is rotating freely there is no movement of the cradle 6 on tracks 4, but if the brake 20 is applied the brake resistance causes the wheel to slow down with the result that the cradle 6 moves in the direction indicated by the arrow 21, thereby generating a definite movement that may be measured.

The recording of the brake resistance is effected by means of a lever 22 pivoted on bracket 2 as at 23, the upper end of the lever engaging the forward end of cradle 6, and the lower end of the lever engaging a plunger 24 operating in a cylinder 25 to which is connected a gauge 26 by means of a tube 27. It is obvious that when the cradle 6 moves forwardly as above described its movement is promptly registered in pounds on gauge 26.

In order to accurately test and adjust the several wheels it is desirable that a definite known brake resistance be applied to all of them. In order to secure the desired uniformity we provide a cylinder 28 adapted to seat against the automobile seat 29 and fitted with a plunger 33 provided with a claw 34 adapted to engage the pedal 35. Air is supplied to the cylinder under pressure from any suitable source through a tube 31 fitted with a reducing valve 32 and a gauge 30, the valve being of a type that will automatically maintain the pressure in the cylinder at a given point.

We contemplate constructing the mechanism in such a manner that the brake lever may be subjected to an indicated pressure corresponding to that applied by the operator's foot, the pressure reading in pounds. The brakes may then be adjusted to exert a certain definite resistance in pounds as read on gauge 30, the pounds pressure to be read on gauge 30 being found by experimentation with each weight of car when its brake lever is subjected to a given pressure.

It is to be understood, of course, that while we have herein shown and described but one specific embodiment of the invention, changes in form, construction, and method of application and operation may be made within the scope of the appended claim.

We claim:

A brake testing device including a frame comprising a base, a plurality of spaced standards secured to said base, an arcuate track supported on said standards, a cradle movably mounted on said track, wheel engaging rollers carried by said cradle, means carried by the cradle for driving said rollers and wheel, a force measuring gage, and means mounted on one of said standards and interposed between the cradle and gage to actuate the latter upon movement of the cradle relative to the frame, whereby to indicate the amount of resistance between the wheel and rollers.

STANLEY M. HALSTEAD.
ANTON I. WICKLAND.
WAYNE C. TUSTIN.